United States Patent
Tanahashi et al.

(10) Patent No.: US 6,436,545 B1
(45) Date of Patent: Aug. 20, 2002

(54) JOINT BODY OF CERAMIC MEMBER AND METAL MEMBER AND METHOD OF PRODUCING THE SAME

(75) Inventors: Nobuyuki Tanahashi, Kasugai; Tomoyuki Fujii, Nagoya; Tsuneaki Ohashi, Ogaki, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/491,586

(22) Filed: Jan. 25, 2000

(30) Foreign Application Priority Data

Jan. 28, 1999 (JP) .......................................... 10-019328

(51) Int. Cl.[7] ................................................ B32B 9/04
(52) U.S. Cl. ..................... 428/469; 428/704; 428/698; 428/596; 428/627; 428/632; 428/673; 428/674; 428/469; 420/489; 420/492; 420/494; 420/495
(58) Field of Search ................................. 428/671, 596, 428/621, 627, 632, 639, 640, 668, 673, 674, 469, 472.2, 704, 702, 689, 698; 420/492, 489, 494, 495, 501, 502

(56) References Cited

U.S. PATENT DOCUMENTS 4,624,897 A * 11/1986 Ito
4,634,638 A * 1/1987 Ainsalie et al.
5,043,229 A * 8/1991 Mizuhara

FOREIGN PATENT DOCUMENTS

| JP | 2-124778 | 5/1990 |
| JP | 8-13280 | 1/1996 |
| JP | 8-277171 | 10/1996 |

\* cited by examiner

*Primary Examiner*—Deborah Jones
*Assistant Examiner*—Wendy Boss
(74) *Attorney, Agent, or Firm*—Burr & Brown (57) ABSTRACT

A joint body according to the invention is strong for a heat cycle and generates no local cracks. The joint body has the following features. An end portion of the metal member and the ceramic member are connected via a metal connection portion. The metal connection portion has a metallized layer formed on the ceramic member and a brazing connection portion interposing at least between the metallized layer and an end portion of the metal member. A melt point of a brazing member constructing the brazing connection portion is lower than that of a brazing member constructing the metallized layer.

9 Claims, 5 Drawing Sheets

JOINT BODY OF CERAMIC MEMBER AND METAL MEMBER AND METHOD OF PRODUCING THE SAME

BACKGROUND OF THE INVENTION

1. Field of the Invention

The present invention relates to a joint body of a ceramic member and a metal member and a method of producing the same.

2. Description of Related Art

A method of directly connecting substrates made of aluminum nitride sintered body is known. For example, in Japanese Patent Laid-Open Publication No. 2-124778 (JP-A-2-124778), aluminum nitride substrates were heated to a temperature of 1800° C.–1900° C., and connected integrally by means of a diffusion connection. Moreover, in Japanese Patent Laid-Open Publication No. 8-13280 (JP-A-8-13280), an aluminum nitride joint body having a relatively high strength is disclosed.

Moreover, a method of brazing one nitride ceramic member to another nitride ceramic member is also known. For example, in Japanese Patent Laid-Open Publication No. 8-277171 (JP-A-8-277171), a joint body having a high anti-corrosive property with respect to halogen series corrosive gas such as $ClF_3$ and so on is obtained by connecting aluminum nitride members by using a brazing material consisting of aluminum, copper or nickel as a main ingredient and an active metal such as titanium as an additive. Such a brazing material is hard to corrode by halogen series corrosive gases and easily wets the surface of aluminum nitride.

However, when a cylindrical metal member is brazed to a flat or a plate-like ceramic member, the following problems were found. For example, in the field of semiconductor manufacturing, the present inventors tried to connect a ring-shaped support member made of KOVAR (Fe—Ni—Co alloy) to a rear surface of a susceptor for supporting a semiconductor wafer made of aluminum nitride sintered body. However, since the area of the suspector becomes larger corresponding to an increase of silicon wafer diameter, it is extremely difficult to connect the ring-shaped support member to the suspector under such a condition that they are correctly aligned. Particularly, when the rear surface of the suspector is not sufficiently flat, or when the rear surface of the suspector is not parallel, i.e., slightly aligned, to an end surface of the ring-shaped support member, the distance between the rear surface of the suspector and the end surface of the ring-shaped support member is locally very small. Therefore, there is a tendency such that the thickness of the brazing layer between the suspector and the ring-shaped support member becomes smaller. In this manner, if the thickness of the brazing layer between the rear surface of the suspector and the end surface of the ring-shaped support member becomes locally thin, a thermal strain generated between the suspector and the ring-shaped support member cannot be absorbed, so that it causes local crack generation.

Moreover, when the ring-shaped support member is an iron based metal, such as KOVAR, stainless steel and so on, a reaction layer such as an intermetallic compound is precipitated due to a reaction between the brazing member and the ring-shaped support member, and the durability and the hardness of the brazing member are increased. As a result, the remaining stress generated in the suspector and the ring-shaped support member becomes larger.

SUMMARY OF THE INVENTION

An object of the invention is to provide a joint body of a ceramic member and a cylindrical metal member in which a metal connection portion having a predetermined thickness along all connection regions between an end portion of the metal member and the ceramic member can be formed. Moreover, an object is also to prevent the deterioration of a portion of the metal connection portion which is particularly contacted to the ceramic member and to prevent an increase of a durability or a hardness of the metal connection portion.

Further, another object of the invention is to provide a joint body of a ceramic member and a cylindrical metal member, which is strong for a heat cycle and is hardly to generate a local crack.

According to the invention, a joint body of a ceramic member and a cylindrical metal member, comprises a structure such that:

(1) an end portion of the metal member and the ceramic member are connected via a metal connection portion;

(2) the metal connection portion has a metallized layer formed on the ceramic member and a brazing connection portion interposing at least between the metallized layer and an end portion of the metal member; and (3) a melt point of a brazing member constructing the brazing connection portion is lower than that of a brazing member constructing the metallized layer.

The inventors thought a method of forming at first a metallized layer on the ceramic member, interposing a brazing member for connection between the metallized layer and an end portion of the metal member, melting the brazing member for connection at a temperature lower than a melt point of a brazing member for metallizing, generating a brazing connection portion at least between the metallized layer and an end portion of the metal member. In the joint body thus obtained, when an end portion of the metal member and a connection surface of the ceramic member are inclined with respect to predetermined relative positions, or even when the distance between the ceramic member and the metal member becomes locally small during brazing (since the flatness of an end portion of the metal member and the flatness of the connection surface of the ceramic member are low), it is possible to keep the metal connection portion having a predetermined thickness by means of the metallized layer.

Further, since the melt point of the brazing connection portion is low, it is possible to prevent the reaction of the metallized layer and the metal member, and to suppress the increase of the durability or the hardness of the metallized layer after connection.

Moreover, in the present invention, since a metal plate made of a low durability metal or a low thermal expansion metal is interposed between the end portion of the cylindrical metal member and the connection surface of the ceramic member, it is possible to obtain a metal connection portion having a predetermined thickness along all the connection regions.

DETAILED DESCRIPTION OF THE INVENTION

First, the respective members which construct a joint body according to the invention will be explained.

As a ceramic member, it is preferred to use a ceramic having anti-corrosive property with respect to halogen series corrosive gases, and it is more preferred to use an aluminum nitride or a dense alumina. It is most preferred to use an aluminum nitride ceramic or an alumina having a relative density of larger than 95%. In the ceramic member, various kinds of additives, such as firing agents and coloring agents, may be included. Moreover, it is preferred that the ceramic member is a sintered member formed by hot press sintering or hot isostatic press sintering.

In the ceramic member, functional members such as a resistance heater, an electrode for static chuck, an electrode for plasma generation, and so on, may be embedded. Moreover, it is possible to apply the present invention for a shadow ring, a tube for generating high frequency plasma, a doom for generating high frequency plasma, and so on. As the other member, a ring made of an anti-corrosive metal for securing a suscepter to a chamber is particularly preferred.

The metal member is not particularly limited, but it is preferred that the metal member has a dew point of larger than 1200° C. Moreover, as a metal constructing the metal member, it is preferred to use a metal having an anti-corrosive property with respect to halogen series corrosive gases, and it is particularly preferred to use a metal selected from a group of nickel, copper, aluminum and an alloy thereof.

The term "an end portion" of the cylindrical metal member refers to the portion opposed to the ceramic member. In this case, the end portion of the cylindrical metal member may be opposed to the connection surface of the ceramic member. In other words, it is possible to perform the present invention in such a manner that a flange portion is arranged to the cylindrical metal member at a side of the ceramic member, and that the flange portion is connected to the ceramic member. Moreover, it is particularly preferred that an inner side surface and an outer side surface of the metal member are substantially vertical with respect to the connection surface of the ceramic member.

The low durability metal and the low thermal expansion metal which construct a metal plate are as follows.

Low Durability Metal

The term "low durability metal" refers to an alloy having a proof strength of lower than 300MPa (particularly preferable lower than 50 MPa). It is preferred that this metal does not react with a brazing member during brazing operation and a melt point of this metal is higher than a brazing temperature. For example, platinum, palladium, gold and an alloy thereof can be used.

Low Thermal Expansion Metal

The term "low thermal expansion metal" refers to a metal having a line thermal expansion coefficient of $1.0 \times 10^{-6} - 12.0 \times 10^{-6}$/K in a temperature range from 25° C. to 700° C. It is preferred to be $3.0 \times 10^{-6} - 10.0 \times 10^{-6}$/K, and more preferred to be $4.0 \times 10^{-6} - 8.0 \times 10^{-6}$/K. It is preferred that this metal does not react with the brazing member during brazing operation and the melt point of this metal is higher than the brazing temperature. For example, molybdenum, tungsten, KOVAR, molybdenum alloy, and tungsten alloy can be used.

It is preferred that the brazing connection member has one side portion contacted to an inner side surface of the cylindrical metal member and the other side portion contacted to an outer side surface thereof. It is possible to further improve the connection strength of the joint body and the durability for the heat cycle by forming the brazing connection portion having the construction mentioned above.

It is preferred that the width of a metallized layer is wider than that of the cylindrical metal member, the metallized layer is extended outward beyond the outer side surface and the inner side surface of the cylindrical metal member, and one side portion and the other side portion are respectively arranged on the metallized layer. In this case, it is possible to further improve a connection strength between the ceramic member and the metal member and a durability for a heat cycle.

It is preferred that the metal plate is not contacted to the ceramic member and the metal member, and is suspended in the brazing connection portion. In this case, it is possible to effectively disperse a stress applied to the connection portion due to a thermal expansion difference between the metal member and the ceramic member.

The cylindrical metal member has a shape, such as a closed curve, if the metal member is viewed from a direction of an end surface thereof. The metal member may be circular or tubular. The closed curve shape is preferred to be a perfect circle or an ellipse, but it is not limited, and thus, it may be a polygon.

It is preferred that the volume of one side portion is smaller than that of the other side portion. In this manner, if the volume of the brazing member is increased on the side of the outer portion of the metal member, it is found that the thermal stress applied to the brazing connection portion can be decreased.

In this case, if it is assumed that the volume of one side portion is 1, the volume of the other side portion is larger than 1, preferably larger than 1.2 and more preferably 2–5.

The difference of dew points between the brazing member for metallizing and the brazing member for connection is sufficient to be the temperature difference at which the metallized layer is not melted when the brazing member for connection is melted. However, it is preferred to be larger than 50° C. and more preferred to be larger than 150° C. Moreover, a preferable range of dew point of the brazing member for metallizing is 800–1200° C., and a preferable range of the brazing member for connection is 500–1100° C.

As the brazing member for metallizing, copper braze, nickel braze, gold braze, palladium braze, and silver braze may be used, but preferably a copper-aluminum-active metal series brazing member is used. In this case, copper is preferably included therein by 50–99 wt %. If the amount of copper exceeds 99 wt %, the connection effect due to aluminum metal and the connection property due to active metal do not occur. If the amount of copper is not larger than 0.5 wt %, the cover film of aluminum oxide can not sufficiently cover the surface of the brazing member. It is particularly preferred that the brazing member for metallizing includes 80–95 wt % of copper, 0.5–20 wt % of aluminum, and more preferably, 1.0–10 wt % of aluminum.

The active metal mentioned above is preferably selected from the group of titanium, zirconium, hafnium, vanadium, niobium and beryllium, and particularly titanium is preferably used as the active metal. If the amount of active metal is larger than 0.5 wt % (more preferably larger than 1 wt %), it is possible to improve the wetting property of the aluminum nitride member. If the amount of active metal is smaller than 5 wt % (more preferably smaller than 3 wt %), it is possible to further improve the anti-corrosive property with respect to the oxidation atmosphere and the halogen series corrosive gas atmosphere.

In this brazing member, silicon or boron may be included as a fourth component. The function of such fourth component is to decrease a melt point. Even at the same temperature, if the fourth component is added, the flowability of the brazing member becomes better. If the amount of the fourth component exceeds 20 wt %, the anti-corrosive property of the connection layer becomes worse, so it is preferred that the amount of the fourth component is smaller than 20 wt %. It is further preferred that the amount of the fourth component is 1–12 wt %.

As the brazing member for connection, a brazing member having a melt point of which is lower than that of the brazing member for metallizing, and specifically, copper braze, silver braze, gold braze and aluminum braze can be used.

Preferably, the main component of the brazing member for connection is made of at least one kind of metal selected from the group of copper, aluminum and nickel. In this case, it is possible to improve the anti-corrosive property, especially the anti-corrosive property with respect to the halogen series corrosive gas. Here, a main component of the brazing member may be copper, aluminum and nickel, respectively, and also may be an alloy thereof. Particularly, if use is made of a brazing member including Al as an main ingredient, it is possible to perform the connection at relatively low temperature, so that the thermal stress after connection becomes smaller. The active metals mentioned above are added with respect to these main components.

It is not necessary to include a third component in this brazing member, but such a third component may be included therein. In the case that the third component is included in the brazing member, it is preferred (from a view point of not affecting the main component) that use is made of at least one kind among Si, Al, Cu and In. It is preferred that the total amount of the third component is smaller than 50 wt %.

Here, aluminum, nickel and copper are the main components of the brazing member. In this case, the amount of the main components is a remainder obtained by substituting the amount of active metal and the third component from 100 wt %, when the total amount of the brazing member is assumed to be 100 wt %. Moreover, the meaning of these metals being the "main component" of the brazing member indicates that the main component occupies the brazing member at larger than 50 wt %.

It is preferred that the total thickness of the metal connection portion is larger than 50 μm and smaller than 500 μm. Moreover, the thickness of the metallized layer is preferably larger than 20 μm and more preferably larger than 50 μm. Further, from the view point of flatness, it is preferred to be smaller than 200 μm.

Hereinafter, the present invention will be explained with reference to the drawings.

Figure 1:
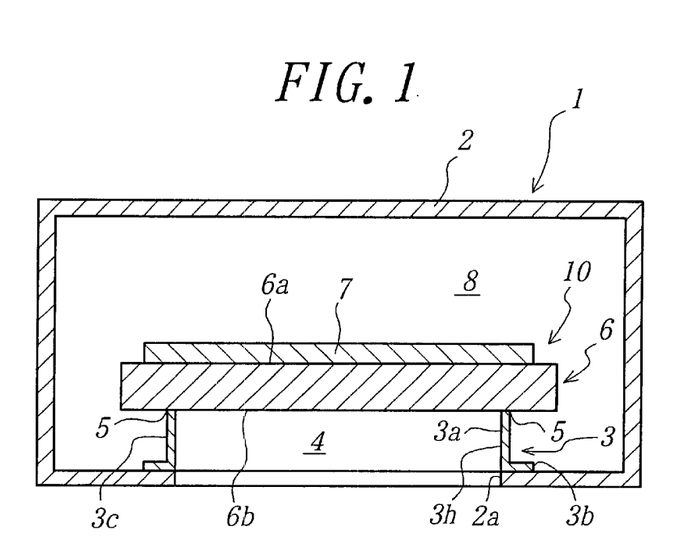
FIG. 1 is a schematic cross sectional view showing one embodiment of a semiconductor manufacturing apparatus to which the present invention can be applied.

As shown in FIG. 1 schematically, a susceptor 6 is accommodated in a chamber 2 of a semiconductor accommodation container 1 and a semiconductor wafer 7 is arranged on a wafer arranging surface 6a of the susceptor 6. With respect to a rear surface 6b (connection surface) of the susceptor 6, a cylindrical portion 3h of a ring 3 (metal member) made of anti-corrosive metal is connected. A numeral 5 is a connection portion to which the present invention should be applied. A flange portion 3b is arranged to the ring 3, and the flange portion 3b is connected to an inner surface of the chamber 2. A numeral 2a is an opening of the chamber 2. A connection portion 5 is positioned between the ring 3 and the susceptor 6, and the ring 3 is exposed to a chamber inner atmosphere 8 and a chamber outer atmosphere 4.

Figure 2:
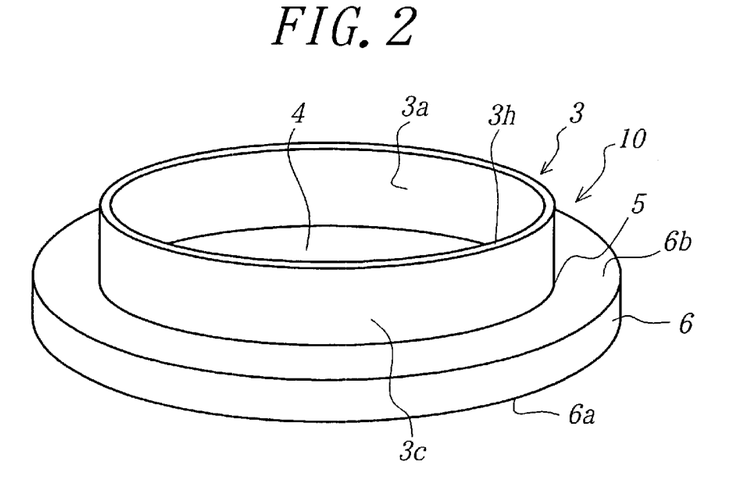
FIG. 2 is a perspective view illustrating a principal part of a joint body between a suspector 6 and a ring-shaped support member 3 in FIG. 1.

FIG. 2 is a schematic perspective view of a joint body 10 of the susceptor 6 and the ring 3. In this figure, the flange portion 3b of the ring 3 is not shown.

Figure 3:
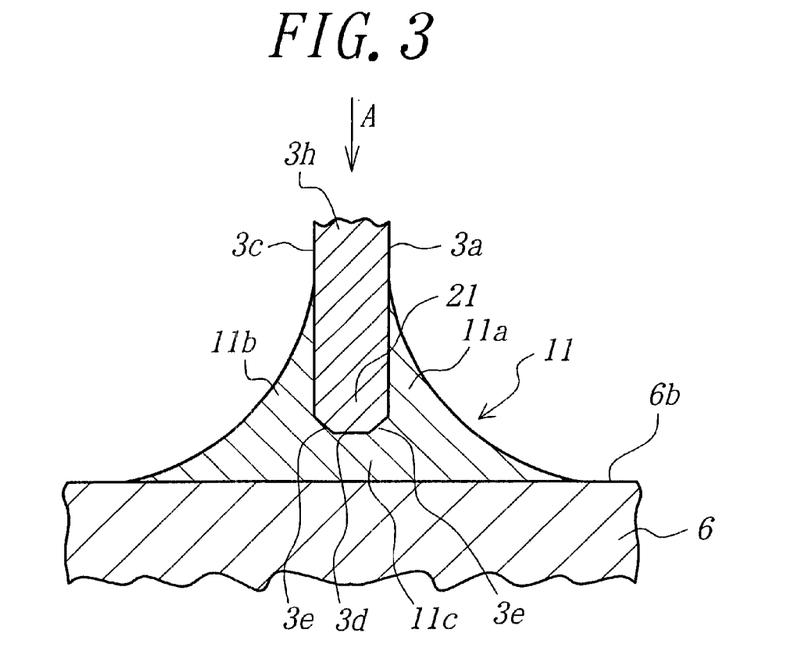
FIG. 3 is a schematic cross sectional view depicting a connection portion of a joint body, a scope of which is out of the present invention.
Figure 4:
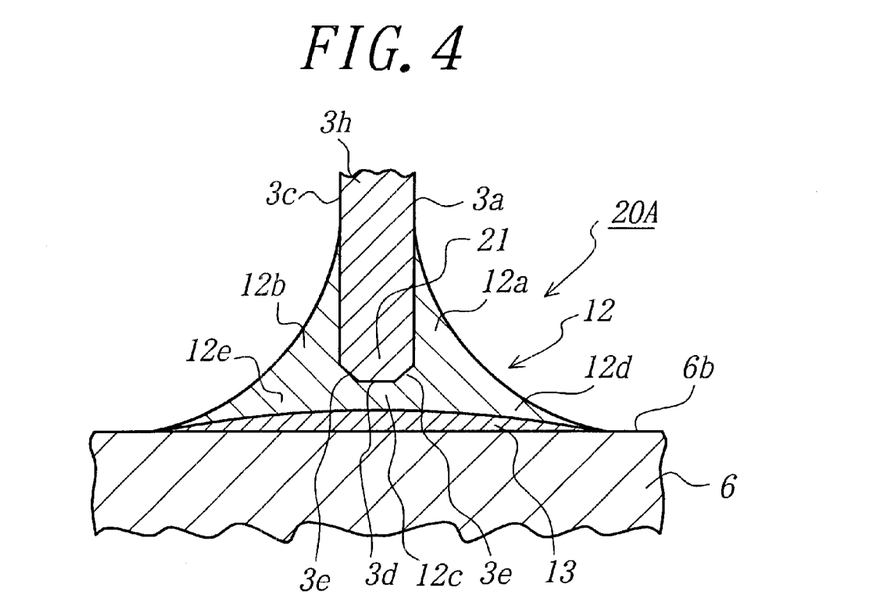
FIG. 4 is a schematic cross sectional view showing a connection portion of the joint body according to the invention, in which a brazing connection portion 12 is arranged on a metallized layer 13.
Figure 5:
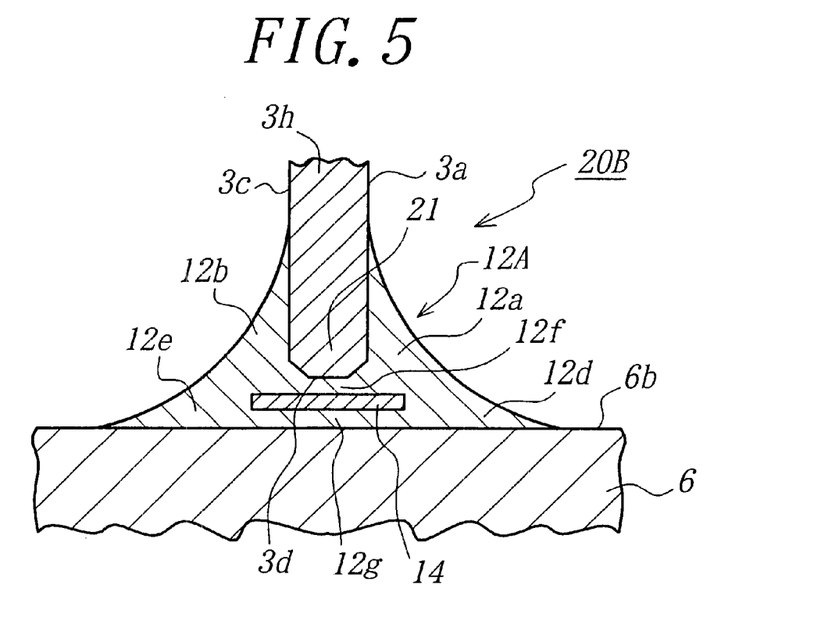
FIG. 5 is a schematic cross sectional view illustrating a connection portion of the joint body according to the invention, in which a metal plate 14 is embedded in a brazing connection portion 12A.
Figure 6:
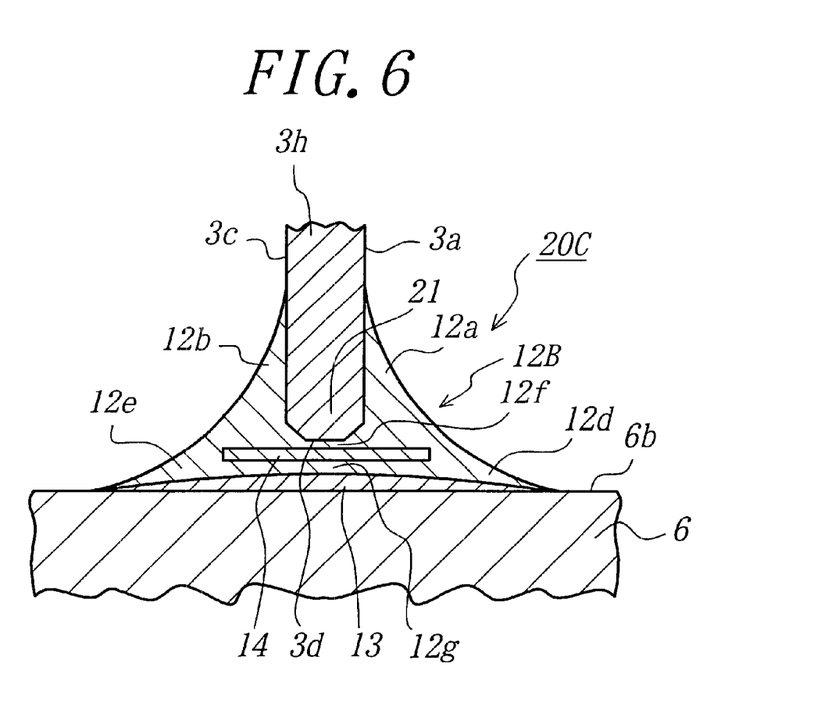
FIG. 6 is a schematic cross sectional view depicting a connection portion of the joint body according to the invention, in which a brazing connection portion 12B is arranged on the metallized layer 13 and the metal plate 14 is embedded in the brazing connection portion 12B.

FIGS. 4–6 are partial cross sectional views according to the present invention, respectively showing schematically a connection portion between the cylindrical metal member 3h and the connection surface 6b of the ceramic member 6. FIG. 3 shows a joint body, a scope of which is out of the present invention.

In FIG. 3, the connection surface 6b of the ceramic member 6 and an end portion 21 of the metal member 3h are connected by means of a brazing connection portion 11. The brazing connection portion 11 has an intermediate portion 11c interposed between an end surface 3d and the connection surface 6b, one side portion 11a and the other side portion 11b. All the brazing connection portion 11 is formed by the same brazing member. In this case, if a stress shown by an arrow A direction is applied to the metal member 3h during a brazing operation, the metal member 3h is moved toward the arrow A direction i.e. it is sunk in a melted brazing member. In this case, since an area of the end surface 3d of the metal member 3h is relatively small, an ascending force of the metal member 3h in the brazing member is small, so that there is a tendency such that a distance between the end surface 3d and the connection surface 6b becomes smaller.

In FIG. 4, a metallized layer 13 is formed on the connection surface 6b of the ceramic member 6, and a brazing connection portion 12 is formed on the metallized layer 13. The metallized layer 13 and the brazing connection portion 12 construct a metal connection portion 20A. In this embodiment, a center portion 12c, one side portion 12a contacted to an inner side surface 3a and the other side portion 12b contacted to an outer side portion 3c are formed on the metallized layer 13. Moreover, skirt portions 12d, 12e respectively extending from the side portions 12a, 12b are formed. Further, in this embodiment, a round portion or a chamfer portion 3e is arranged to the end portion 21 of the metal member 3h at a portion between the end surface 3d and the inner side surface 3a or the outer side surface 3c. In this manner, it is possible to reduce a stress due to a thermal expansion difference between the metal member 18 and the ceramic member 6.

In the metal connection portion 20B shown in FIG. 5, a brazing connection portion 12A is formed on the connection surface 6b of the ceramic member 6. The brazing connection portion 12A has one side surface 12a, the other side surface 12b, skirt portions 12d and 12e, and includes a metal plate 14 between the end surface 13d and the connection surface 6b. The metal plate 14 is not contacted to both of the end portion 21 and the connection surface 6b and is suspended in the brazing member. Intermediate layers 12f and 12g are formed respectively between the metal plate 14 and the end surface 3d or the connection surface 6b.

In a metal connection portion 20C shown in FIG. 6, the metallized layer 13 is further formed on the connection surface 6b. A brazing connection portion 12B is formed on the metallized layer 13. The metal plate 14 is embedded in the brazing connection portion 12B at a portion between the metallized layer 13 and the end surface 3d.

Experiment 1

Manufacturing Method

A joint body having the construction shown in FIG. 4 was manufactured. In this case, as the ceramic member 6, a disk member made of an aluminum nitride sintered body having a diameter of 200 mm and a thickness of 20 mm was used. As the metal member 3, a ring-shaped KOVAR plate having an outer diameter of 102 mm, an inner diameter of 100 mm, a thickness of 1 mm and a height of 20 mm was used.

Figure 7A:
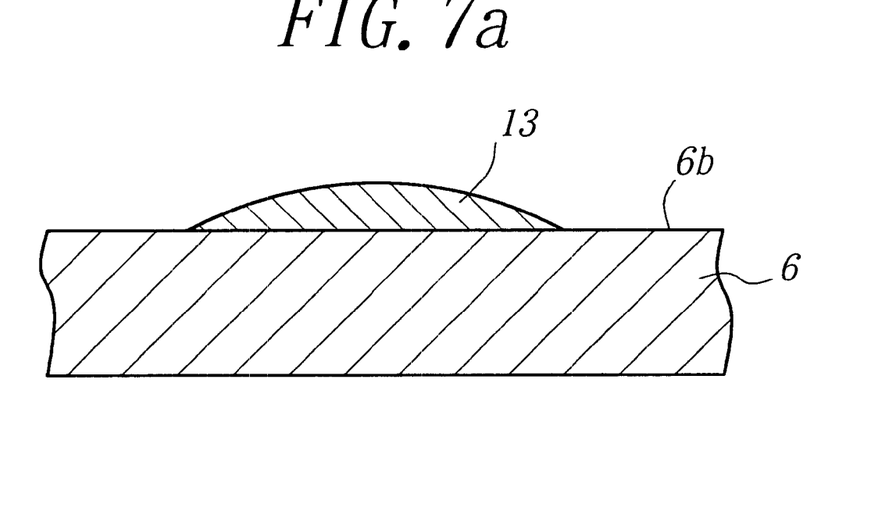
FIG. 7a is a cross sectional view showing the metallized layer 13 formed on a connection surface 6b.

The ring-shaped brazing member for metallizing was provided on the connection surface 6b of the ceramic member. This brazing member was dimensioned to have an outer diameter of 112 mm, an inner diameter of 92 mm and a thickness of 0.1 mm. The chemical composition of this brazing member was 92.75 wt % of copper, 2 wt % of aluminum, 3 wt % of silicon and 2.25 wt % of titanium. The brazing member mentioned above was heated at 1050° C. for 5 minutes under a pressure of $10^{-5}$ Torr to form the metallized layer 13 shown in FIG. 7a. It should be noted that FIGS. 7a and 7b show the connection portion only.

Figure 7B:
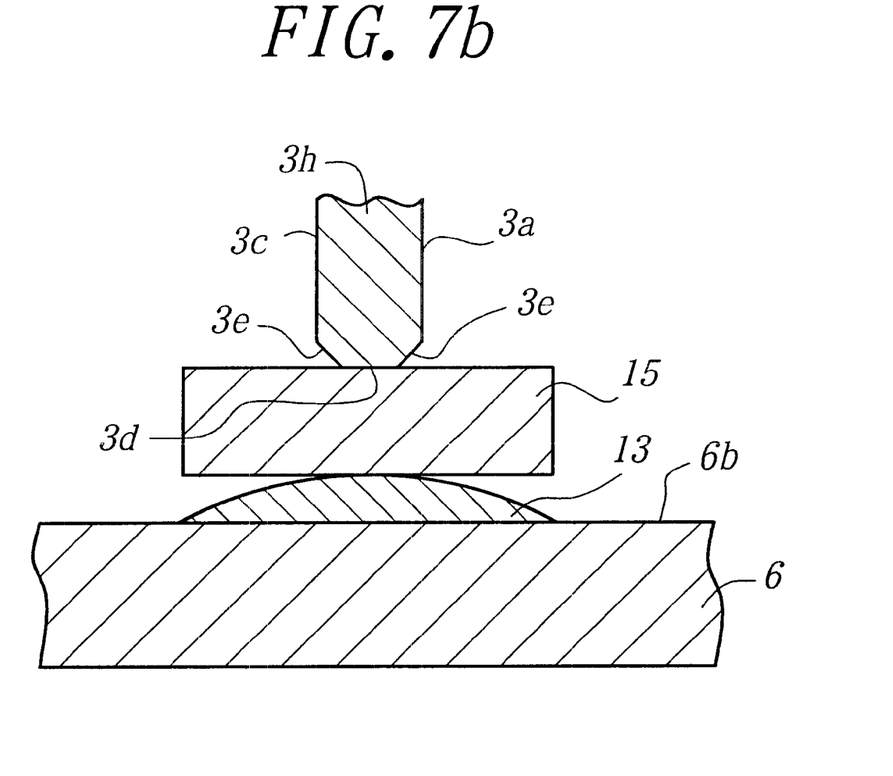
FIG. 7b is a cross sectional view illustrating a state such that a brazing member for connection 15 and the metal member 3 are arranged on the metallized layer 13.

Then, as shown in FIG. 7b, the brazing member 15 for connection was provided on the metallized layer 13, and the end surface 3d of the metal member 3 was provided on the brazing member 15 for connection. Moreover, a weight (not shown) having a weight of 2 kg, was provided on the metal member 3. In this case, the shape of the brazing member 15 for connection was a ring-shape. The ring-shaped brazing member 15 was dimensioned to have an outer diameter of 106 mm, an inner diameter of 96 mm and a thickness of 0.1 mm. The chemical composition of the ring-shaped brazing member 15 was 63 wt % of silver, 32.25 wt % of copper and 1.75 wt % of titanium. The connection portion mentioned above was heated at 850° C. for 10 minutes under a pressure of $10^{-5}$Torr to form the brazing connection portion shown in FIG. 4.

Properties of the Joint Body

In the thus obtained joint body, the thickness of the metal connection portion was within 50–200 μm along all circumferential portion of the ring-shaped connection portion.

The joint body was examined by means of a helium leak measuring apparatus. As a result, the helium leak amount was not larger than $1 \times 10^{-8}$ Torr·l/s. Then, the joint body was subjected to a heat cycle between room temperature and 500° C. under an atmosphere of $1 \times 10^{-9}$ Torr. In this heat cycle, hold times at room temperature and at 500° C. were 10 minutes respectively, the ascending rate and descending rate were 20° C. respectively, and the number of heat cycles was 50. Then, after subjecting the joint body to the heat cycle, the joint body was examined by means of a helium leak measuring apparatus. As a result, the helium leak amount was not larger than $1 \times 10^{-8}$ Torr·l/s.

Experiment 2

As in Experiment 1, a joint body having the construction shown in FIG. 4 was obtained. In this case, the chemical composition of the brazing member for metallizing was 92.75 wt % of copper, 2 wt % of aluminum, 3 wt % of silicon and 2.25 wt % of titanium. Moreover, the chemical composition of the brazing member for connection was 72 wt % of silver and 28 wt % of copper, and the brazing member for connection was heated at 800° C. for 5 minutes under a pressure of $10^{-5}$ Torr.

In the thus obtained joint body, the thickness of the metal connection portion was within 50–200 μm along all circumferential portion of the ring-shaped connection portion. The joint body was examined by means of a helium leak measuring apparatus. As a result, the helium leak amount was not larger than $1 \times 10^{-8}$ Torr·l/s. Then, the joint body was subjected to a heat cycle test as in Experiment 1. Then, the joint body was examined by means of a helium leak measuring apparatus. As a result, the helium leak amount was not larger than $1 \times 10^{-8}$ Torr·l/s.

Comparative Experiment

A joint body having the construction shown in FIG. 3 was manufactured. In this case, the ceramic member 6 and the KOVAR plate 3 were the same members as those of Experiment 1. The brazing member 15 for connection was provided on the connection surface 6b of the ceramic member and the end surface 3d of the metal member 3 was provided on the brazing member 15 for connection. Moreover, a weight (not shown) having a weight of 2 kg, was provided on the metal member 3. In this case, the shape of the brazing member 15 for connection was a ring-shape. The ring-shaped brazing member 15 was dimensioned to have an outer diameter of 106 mm, an inner diameter of 96 mm and a thickness of 0.1 mm. The chemical composition of the ring-shaped brazing member 15 was 92.75 wt % of copper, 2 wt % of aluminum, 3 wt % of silicon and 2.25 wt % of titanium. The connection portion mentioned above was heated at 1050° C. for 5 minutes under a pressure of $10^{-5}$ Torr to form the brazing connection portion shown in FIG. 3.

In the thus obtained joint body, the thickness of the metal connection portion was within 10–30 μm along all circumferential portion of the ring-shaped connection portion. The joint body was examined by means of a helium leak measuring apparatus. As a result, the helium leak amount was $2 \times 10^{-8}$ Torr·l/s. Then, the joint body was subjected to a heat cycle test as in Experiment 1. Then, the joint body was examined by means of a helium leak measuring apparatus. As a result, the helium leak amount was not larger than $1 \times 10^{-7}$ Torr·l/s.

Experiment 3

Figure 8:
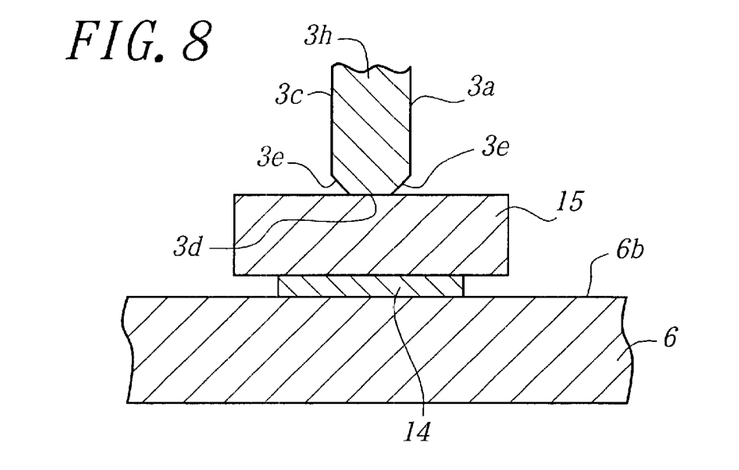
FIG. 8 is a cross sectional view depicting a state such that the metal plate 14, the brazing member for connection 15 and the metal member 3 are arranged on the connection surface 6b.

A joint body having the construction shown in FIG. 5 was manufactured. In this case, the ceramic member 6 and the metal member 3 were the same members as those of Experiment 1. As shown in FIG. 8, the ring-shaped metal plate 14 was provided on the connection surface 6b. The metal plate 14 was made of platinum and was dimensioned to have an outer diameter of 104 mm, an inner diameter of 98 mm and a thickness of 0.1 mm. The brazing member 15 for connection was provided on the metal plate 14 and the end surface 3d of the metal member 3 was provided on the brazing member 15. Moreover, a weight (not shown) having a weight of 2 kg, was provided on the metal member 3. In this case, the shape of the brazing member 15 for connection was a ring-shape. The ring-shaped brazing member 15 was dimensioned to have an outer diameter of 106 mm, an inner diameter of 96 mm and a thickness of 0.1 mm. The chemical composition of the ring-shaped brazing member 15 was 63 wt % of silver, 32.25 wt % of copper and 1.75 wt % of titanium. The connection portion mentioned above was heated at 850° C. for 5 minutes under a pressure of 10–5 Torr to form the brazing connection portion shown in FIG. 5.

In the thus obtained joint body, the thickness of the metal connection portion was within 110–200 μm along all circumferential portion of the ring-shaped connection portion. The joint body was examined by means of a helium leak measuring apparatus. As a result, the helium leak amount was $1\times10^{-8}$ Torr·l/s. Then, the joint body was subjected to a heat cycle test as in Experiment 1. Then, the joint body was examined by means of a helium leak measuring apparatus. As a result, the helium leak amount was not larger than $1\times10^{-8}$ Torr·l/s.

Experiment 4

Figure 9:
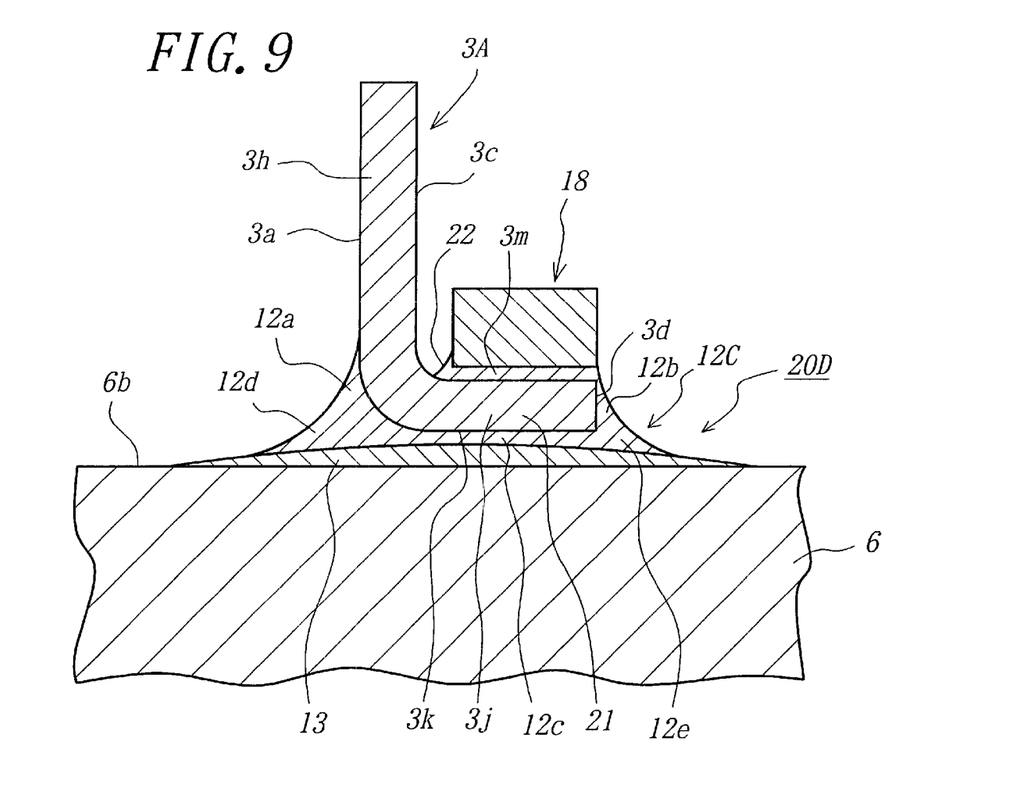
FIG. 9 is a schematic cross sectional view showing a connection portion between a flange member 3j formed at an end portion of the metal member and the ceramic member 6.

A joint body, schematically shown in FIG. 9, was manufactured. In FIG. 9, a bent portion or the flange portion 3j is provided on a tip of a metal member 3A. The flange portion 3j is extended substantially parallel to the connection surface 6b of the ceramic member. The metal member and the end surface 3d of the flange portion are provided substantially vertical to the connection surface 6b. The metallized layer 13 is provided on the connection surface 6b of the ceramic member, and a brazing connection portion 12C is provided on the metallized layer 13. The members mentioned above construct a metal connection portion 20D. In the brazing connection portion 12C, the center portion 12c, one side portion 12a and the other side portion 12b are provide on the metallized layer 13. Moreover, the skirt portions 12d and 12e are extended from the side portions 12a and 12b respectively. The center portion 12c is provided between a main surface 3k of the flange portion 3j and the metallized layer 13.

According to the embodiment mentioned above, it is possible to further improve the connection strength between the cylindrical member 3A and the ceramic member 6. On the other hand, the thermal stress between the metal member 3A and the ceramic member 6 is liable to be larger. Therefore, it is preferred to connect a stress reduction member 18 made of ceramic at a side of an upper main surface 3m of the flange portion 3j via a brazing member 22.

Hereinafter, an actual example for manufacturing the joint body shown in FIG. 9 is explained.

The ceramic member 6 was the same as that of Experiment 1. The metal member 3A was formed by providing the flange portion 3j having a width of 9.0 mm and a thickness of 0.5 mm at an inner portion of the ring-shaped KOVAR (Fe—Hi—Co alloy) plate having an outer diameter of 102 mm, an inner diameter of 100 mm, a thickness of 1 mm and a height of 22 mm.

The ring-shaped brazing member for metallizing was provided on the connection surface 6b. The brazing member was dimensioned to have an outer diameter of 130 mm, an inner diameter of 90 mm and a thickness of 0.2 mm. The chemical composition of the brazing member was 92.75 wt % of copper, 2 wt % of aluminum, 3 wt % of silicon and 2.25 wt % of titanium. The brazing member mentioned above was heated at 1050° C. for 5 minutes under a pressure of $10^{-5}$ Torr to form the metallized layer 13 shown in FIG. 9.

Then, the brazing member for connection was provided on the metallized layer 13, and the flange portion 3j of the metal member 3A was provided on the metallized layer 13. The shape of the brazing member for connection was a ring-shape. The ring-shaped brazing member was dimensioned to have an outer diameter of 120 mm, an inner diameter of 100 mm and a thickness of 0.1 mm. Then, another ring-shaped brazing member for connection was provided on the flange portion 3j, and the ring-shaped stress reduction member 18 made of aluminum nitride sintered body was provided on the another ring-shaped brazing member. Another ring-shaped brazing member was dimensioned to have an outer diameter of 120 mm, an inner diameter of 104 mm and a thickness of 0.1 mm. The chemical composition of respective brazing members for connection was 63 wt % of silver, 32.25 wt % of copper and 1.75 wt % of titanium. Moreover, the stress reduction member was dimensioned to have an outer diameter of 120 mm, an inner diameter of 104 mm and a thickness of 0.5 mm. A weight (not shown) having a weight of 2 kg, was provided on the stress reduction member. The connection portion mentioned above was heated at 850° C. for 10 minutes under a pressure of $10^{-5}$ Torr.

In the thus obtained joint body, the thickness of the metal connection portion was within 50–200 μm along all circumferential portion of the ring-shaped connection portion.

The joint body was examined by means of a helium leak measuring apparatus. As a result, the helium leak amount was $1\times10^{-8}$ Torr·l/s. Then, the joint body was subjected to a heat cycle test as Experiment 1. Then, the joint body was examined by means of a helium leak measuring apparatus. As a result, the helium leak amount was not larger than $1\times10^{-8}$ Torr·l/s.

As mentioned above, according to the invention, it is possible to obtain a joint body of a ceramic member and a cylindrical metal member in which a metal connection portion having a predetermined thickness along all connection regions between an end portion of the metal member and the ceramic member can be formed. Moreover, since the melt point of the brazing member for connection is low, it is possible to prevent the deterioration of a portion of the metal connection portion which is particularly contacted to the ceramic member and to prevent an increase of a durability or a hardness of the metal connection portion. As a result, it is possible to provide a joint body which is strong for the heat cycle and generates no local cracks.

What is claimed is:

1. A joint body of a ceramic member and a cylindrical metal member, comprising:

(1) an end portion of the metal member connected to the ceramic member via a metal connection portion;

(2) the metal connection portion having a metallized layer formed on the ceramic member and a brazing connection portion interposed at least between the metallized layer and the end portion of the metal member; and (3) a brazing member for constructing the brazing connection portion having a melt point which is lower than that of a brazing member constructing the metallized layer, wherein the metallized layer is formed by a brazing member including 50–90 wt % of copper, 0.5–20 wt % of aluminum, and 0.5–5 wt % of at least one active metal selected from the group consisting of titanium, zirconium, hafnium, vanadium, niobium and beryllium.

2. The joint body according to claim 1, wherein the brazing connection portion has one side portion contacted to an inner side surface of the metal member and another side portion contacted to an outer side surface of the metal member.

3. The joint body according to claim 2, wherein a width of the metallized layer is wider than that of the metal member, the metallized layer is extended outward beyond the outer side surface and the inner side surface of the metal member, and one side portion and the other side portion are respectively arranged on the metallized layer.

4. The joint body according to claim 1, wherein the metal connection portion includes a metal plate embedded in the brazing connection portion, and the metal plate is made of a low durability metal or a low thermal expansion metal.

5. The joint body according to claim 1, wherein the ceramic member is formed by aluminum nitride or alumina.

6. The joint body according to claim 1, wherein the metal member comprises a metal selected from the group consisting of a Fe—Ni—Co alloy, molybdenum, molybdenum alloy, tungsten and tungsten alloy.

7. The joint body according to claim 4, wherein the metal plate is not contacted to the ceramic member and the metal member, and is suspended in the brazing connection portion.

8. The joint body according to claim 2, wherein a volume of one side portion is smaller than that of the other side portion.

9. A method of producing the joint body set forth in claim 1, comprising the steps of:
   arranging a brazing member for metallizing on the ceramic member;
   melting the brazing member for metallizing to generate the metallized layer;
   arranging a brazing member for connection between the metallized layer and an end portion of the metal member; and
   melting the brazing member for connection at a temperature lower than a melt point of the brazing member for metallizing to generate the brazing connection portion at least between the metallized layer and an end portion of the metal member.

* * * * *